United States Patent [19]

Schwob et al.

[11] 4,271,825
[45] Jun. 9, 1981

[54] SOLAR ENERGY COLLECTOR

[75] Inventors: Alain L. C. Schwob, Meyzieu; Bruno J. Busschaert, Lyons; Claude A. M. Ivorra, Decines, all of France

[73] Assignee: Phenol Engineering S.a.r.l., Villeurbanne, France

[21] Appl. No.: 47,784

[22] Filed: Jun. 11, 1979

[30] Foreign Application Priority Data

Jun. 9, 1978 [FR] France ................... 78 17860

[51] Int. Cl.³ ............................... F24J 3/02
[52] U.S. Cl. ...................... 126/450; 126/444
[58] Field of Search .......... 126/450, 449, 446, 445, 126/444, 443, 432; 165/82, 171

[56] References Cited

U.S. PATENT DOCUMENTS

| 3,866,285 | 2/1975 | Clark | 126/450 |
|---|---|---|---|
| 4,138,991 | 2/1979 | Lorenz | 126/450 |
| 4,185,616 | 1/1980 | Johnson | 126/443 |
| 4,186,722 | 2/1980 | Muessig | 126/450 |

FOREIGN PATENT DOCUMENTS 2530152  2/1977  Fed. Rep. of Germany .......... 126/446

Primary Examiner—James C. Yeung
Attorney, Agent, or Firm—Browdy & Neimark

[57] ABSTRACT

A solar energy collector includes an absorber and connecting pipes which are to go to a utilization installation. A cover for the absorber is provided by a first shell, which is transparent and has a peripheral flange. The absorber is carried on a sheet of thermally insulating material which is positioned over a plate of phenol foam. The plate is positioned in a second sheet, which may be molded in the same mold as the first shell and also as a peripheral flange. The sheet of insulating material is sufficiently large and so shaped so that its edges may be clamped between the peripheral flanges of the two shells. Joining members extend along the peripheral flanges of the shells and hold the edge portions of the sheet of insulating material between them.

10 Claims, 3 Drawing Figures

SOLAR ENERGY COLLECTOR

BACKGROUND OF THE INVENTION

This invention relates to an improvement in solar energy collectors of the type described in French patent No. 77 24 147 of Aug. 1, 1977.

The solar energy collector described in above-mentioned French patent is made of a carrying structure of thermally insulating material in the shape of a rectangular plane panels, an absorber fastened to this structure and connected to the installation by connecting pipes going through said structure and a shell-shaped transparent cover able to cover the structure by acting as the housing for the absorber and fastened to the carrying structure by a suitable technique.

As indicated in the French patent, this known solar energy collector has the advantage of costing less than previously known ones.

SUMMARY OF THE INVENTION

The present invention aims at cutting the cost more without reducing the output of the pickup.

For this purpose, according to the improvement to which the invention relates, the carrying structure of thermally insulating material is made of a phenol foam plate sandwiched between an outside shell of suitable plastic such as acrylonitrile-butadiene-styrene (ABS) and a sheet of heat-resistant, thermally insulating material, such as cardboard, this outside shell being provided with a peripheral flange making possible its assembly with a fluid-tight to a second shell which functions as a cover for the absorber and has a complementary peripheris flange joint.

This device has the advantage, in comparison with the one described and claimed in the patent cited, of absorbing expansion differences due to the heating differences without harming the fluid tightness and output of the solar energy collector.

Advantageously, the peripheral flange of each shell comprises a plane part located in the plane of the corresponding shell opening under consideration and edged by a lip inclined so as to go away from the plane.

Thus, for assembly of the carrying structure and cover of a solar energy collector, it suffices to engage on the flanges, applied against one another, preferably with the sheet of insulating material therebetween of the two shells of this solar energy collector a fluid-tight joint member of rubber or the like of square or rectangular section and exhibiting a groove of approximately T-shaped section.

This type of assembly offers the advantage of tolerating a certain sliding of one flange in relation to the other which considerably reduces the risks of breaking due to expansion differences which, themselves are due to heating differences.

This solar energy collector further makes it possible to assemble in a fluid-tight manner two pickups according to the invention with double flanges.

Preferably, to make it possible to create an air space between the assembly joint and the shells of the pickup, by contributing to obtaining a better fluid tightness, according to an advantageous embodiment of the invention, each wing of the assembly joint exhibits a flexible lip applied against the side wall of the corresponding shell.

According to another characteristic of the invention, the shell constituting the pickup cover is made of polycarbonate, this material having the advantage of trapping infrared rays possibly reemitted by the absorber and which are of a different wavelength from those emitted by the sun.

By this arrangement, the output of the solar energy collector of the present invention is improved still more.

BRIEF DESCRIPTION OF THE DRAWINGS

In any case, the invention will be better understood from the following description with reference to the accompanying drawing figures, showing by way of non-limiting example, an embodiment of a solar energy collector according to the invention wherein.

DESCRIPTION OF THE PREFERRED EMBODIMENT

Figure 1:
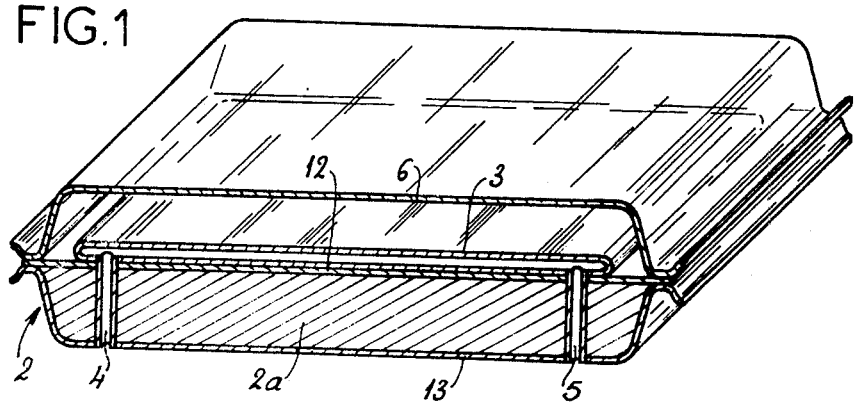
FIG. 1 is a pictorial view in cross section of a solar energy collector according to the invention.

As shown in FIG. 1, a carrying structure 2 of thermally insulating material and having the shape of a rectangular flat panel to support an absorber 3, is made of a plastic foam plate 2a sandwiched between a sheet 12 of heat-resistant, thermally insulating material and an outside shell of the same shape as a shell 6 constituting the solar energy cover. Input pipes 4 and output pipes 5 go through the carrying structure 2, i.e., the sheet 12, the phenol foam plate 2a and a shell 13 which holds the plate 2a.

By this arrangement, the making of the carrying structure of solar energy collector is facilitated still more since it suffices to make the shell 13 with the same mold as that used for making the transparent cover 6 and to pour into this shell 13, the material which forms the phenol foam plate 2a which is then covered with the sheet 12. The shell 13 is advantageously made of acrylonitrile-butadienestyrene (ABS).

The sheet 12 is advantageously made of cardboard, composed of cellulose fibers bonded by organic binders such as butadiene and sold on the market under the trademark CELLODERM.

Each of the shells 7 and 13 is provided with a peripheral flange facilitating their assembly; and preferably the sheet 12 is extended so as to be fastened between the flanges of the shells 6 and 13.

The drawing shows an advantageous embodiment of this peripheral flange of the shells 6 and 13. In this embodiment, the flange of each shell 6 or 13 comprises a plane part 6a and 13a, respectively, located in the plane of the opening of the corresponding shell considered and edged by a lip 6b and 13b, respectively, inclined or bent back so as to go away from the plane which also constitutes the plane of joining of the two shells 6 and 13.

Figure 2:
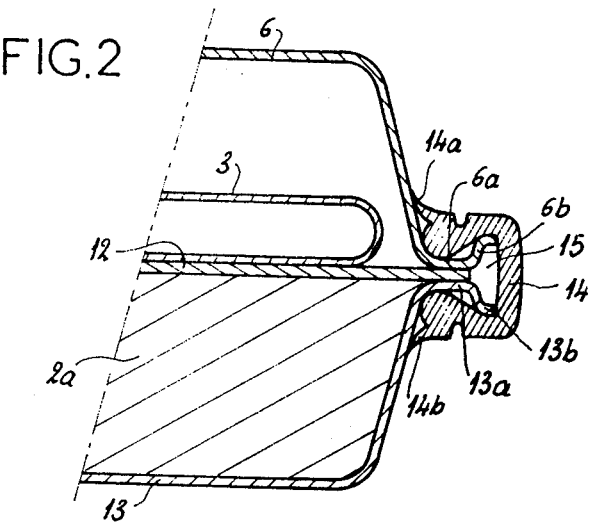
FIG. 2 is, on an enlarged scale, a partial view in cross section of the area of assembly of the two shells of a solar energy collector, showing a joining member associated with the shells.

FIG. 2 shows a mode of assembly of the shells 6 and 13 with a fluid-tight joint using a joining member or members 14 with an approximately square section and exhibiting a longitudinal groove 15 with a T-shaped section able to engage on the flanges 6a, 6b and 13a, 13b of the shells 6 and 13. It is to be understood that a respective member 14 extends along each side and each end of the abutted shells 6 and 13 only one being visible in FIG. 2.

This solution offers not only the advantage of making a simple assembly possible but also the advantage of making possible relative movements between the two shells 6 and 13 that undergo different expansions because of the different temperatures to which they are subjected. It should further be noted that the heat shocks caused by the passage of clouds on the shell 6, which constitutes the solar energy collector cover, can be brutal and the tolerance of the relative movements between the two shells offers the considerable advantage of reducing the risks of breaking. Actually, if the shape of the shell 6 already described in the above-mentioned French patent offers the advantage of facilitating deformations due to the phenomenon of expansion of the material, the assembly of the two shells 6 and 13 with the joint provided by joining member 14 makes possible a sliding of the flange of one shell in relation to that of the other, which has only the effect of causing a transient deformation of the joining member 14.

According to another interesting characteristic of the invention, each wing of the joining member 14 carries along its free edge a flexible and very deformable lip 14a which, being applied to the corresponding shell 6 or 13 contributes to improving the fluid tightness of the pickup. This fluid tightness is useful because it prevents penetration of moist air under the cover shell 6 of the solar energy collector which is advantageous since, moist air being a better conductor of heat than dry air, this would facilitate the redispersion of the calories received by the absorber 3.

Another advantage linked to the shape of the joining member or members 14 resides in the presence of the formation of an air space in groove 15 and along lips 14a, which again reduces the loss of heat on the periphery of the solar energy collector.

Finally, according to another characteristic of the invention, the cover shell 6 is made of a polycarbonate. This product actually has the property of stopping infrared rays and it has been found that the infrared rays for which it constitutes a barrier are those whose wavelength corresponds to those emitted by the absorber 3 and not those emitted by the sun.

Thus, the cover shell 6 therefore offers the advantage of letting the infrared rays emitted by the sun to pass and which are used for heating the fluid carried in the absorber, but, on the other hand, it corrects on the inside of the pickup the infrared rays emitted by the absorber 3 thus eliminating a risk of additional heat dissipation.

Figure 3:
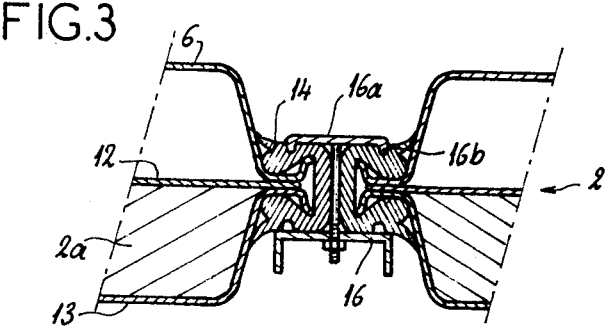
FIG. 3 is a partial view similar to FIG. 2 showing a mode of assembly of two juxtaposed solar energy collectors.

FIG. 3 shows a mode of assemblying two juxtaposed solar energy collectors according to a variant of the invention. This mode of assembly consists in locking between double flanges 16, joints formed by joining members 14 corresponding to the adjacent edges of two juxtaposed solar energy collectors. Thus, it is possible to achieve a fluid-tight bond between juxtaposed solar energy collectors; for this it suffices to give wings 16a of the upper double flange an edge rim 16b which, slightly penetrating into one of joining members 14, assures the desired fluid tightness.

It goes without saying and has been brought out above, the invention is not limited to the sole embodiment of a solar energy collector described above by way of a non-limiting example; rather, it encompasses all other possible embodiments and variants, its scope being defined by the appended claims.

We claim:

1. In a solar energy collector having a carrying structure of thermally insulating material in the shape of a rectangular plane panel, an absorber supported by said structure, connecting pipes going through said structure for connection to a liquid utilization installation, and a transparent cover in the shape of a first shell defining an outside wall and positioned over said structure and housing said absorber, the improvement comprising a second shell of suitable plastic material defining an outer wall and a sheet of thermally insulating, heat-resistant material, wherein said carrying structure of thermally insulating material is made up of a phenol foam plate sandwiched between said second shell of suitable plastic material and said sheet of thermally insulating, heat-resistant material, said second shell and said first shell constituting the cover of the collector and each being provided with a respective peripheral flange, said pipes extending through said sheet of thermally insulating, heat-resistant material, said carrying structure and said second shell, said thermally insulating, heat-resistant sheet being provided with a peripheral extension positoned between said flanges of said shells, including means for fastening said first shell to said second shell along their said peripheral flanges as a single joint and means for supporting said absorber free of contact with said outside walls.

2. An improved collector according to claim 1, wherein said means for fastening provides a fluid-tight joint.

3. An improved collector according to claim 1 or claim 2, wherein said sheet of thermally insulating, heat-resistant material is cardboard made up of cellulose fibers bonded by at least one organic binder.

4. An improved collector according to claim 3, wherein said binder is butadiene.

5. An improved collector according to claim 1 or claim 12, wherein said peripheral flange of each said shell comprises a plane portion located in the plane of opening of the corresponding said shell and edged by a respective lip so inclined that it extends away from said plane.

6. An improved collector according to claim 5, wherein said means for fastening said shells is at least one member of square or rectangular section exhibiting a longitudinal groove substantially of T-shape.

7. An improved collector according to claim 6, wherein each wing of said member includes a flexible lip positioned against a side wall of a respective one of said shells.

8. An improved collector according to claim 1 or claim 12, wherein said second shell is made of acrylonitrile-butadiene-styrene (ABS).

9. An improved collector according to claim 1 or claim 12, wherein said first shell constituting the cover is made of polycarbonate.

10. A collecting array comprising a plurality of solar energy collectors according to claim 1 or claim 2, and wherein said means for fastening comprise adjacent joining members of adjacent ones of said solar energy collectors, said adjacent joining members being fixed to one another.

* * * * *